United States Patent Office 2,735,973
Patented Feb. 21, 1956

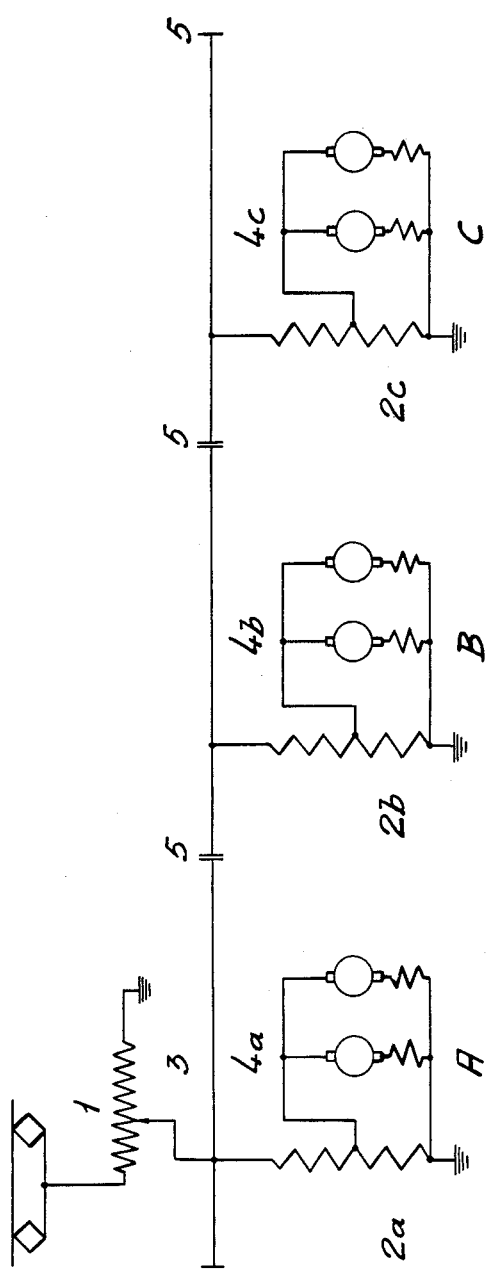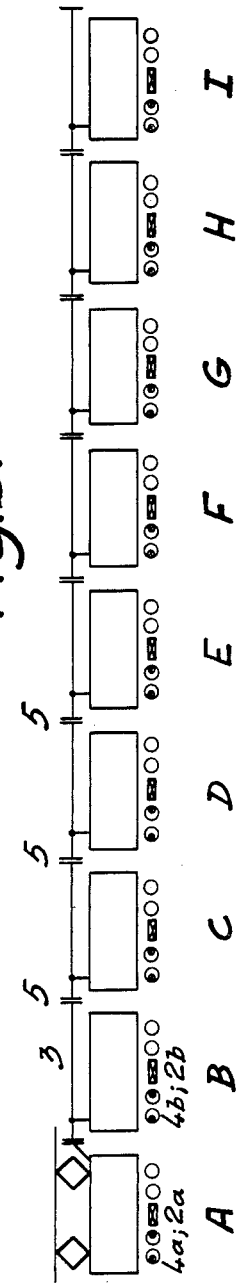

2,735,973

INSTALLATION FOR THE OPERATION OF THE TRACTION MOTORS OF ELECTRIC TRAINS WITH THE USE OF SINGLE PHASE ALTERNATING CURRENT

Olov Akerman, Stockholm, Sweden, assignor to Ab. Hagglund & Söner, Ornskoldsvik, Sweden Application January 16, 1950, Serial No. 138,819

Claims priority, application Sweden January 25, 1949

1 Claim. (Cl. 318—94)

The system of operating electric railway trains by feeding a plurality of traction motors distributed on as many driving axles of the train with single phase alternating current is previously known. It is known, likewise, in the application of said system to have one of the cars in the train provided with an installation comprising a current collector, a main switch, and a high tension transformer connected between the current collector and earth.

The present invention is concerned with this previously known system and with installations of the above-named general description.

However, in contradistinction to the known installations, which make use of a special low tension transformer winding connected to a bipolar double-feeder common to the traction motors, a distinguishing novel feature of the present invention resides in that a variable intermediate outtake from the high tension transformer, which latter takes the form of an autotransformer, is connected to a unipolar high tension feeder common to all of the traction motors in the train, which are connected in parallel groups between said unipolar feeder and earth.

A second novel feature of the invention resides in that each individual group of shunted motors is fed by a secondary autotransformer connected between said unipolar feeder and earth.

The invention will be described more closely with reference to the accompanying drawing, wherein Fig. 1 shows a wiring diagram according to the invention and Fig. 2 is a diagrammatic view of a train comprising a number of cars, the traction motors of which are fed over a unipolar feeder extending from a car carrying the current collector.

According to the drawing, the first car A in the train of cars A, B, C, etc. is taken to carry the current collector and its auxiliary equipment, which arrangement is not necessary, however, it being equally possible with the use of the system to arrange the current collector etc. on any of the other cars in the train.

Now, the auxiliary equipment of the car carrying the current collector comprises the high tension transformer in the form of an autotransformer 1, the single winding of which is connected between the current collector and earth. A variable outtake from the transformer 1 is connected to the unipolar high tension feeder 3, which is most common to all of the traction motors of the train and has the condensers 5 connected into the same. All of the traction motors 4a, 4b, 4c are connected in parallel groups between the feeder 3 and earth over individual autotransformers for the several groups of motors on the cars A, B, C, etc.

Fig. 2 indicates a train comprising a number of cars A—I equipped in the manner shown in Fig. 1.

The great advantage of an installation according to the invention is that a bipolar feeder extended through the train with the associated special coupling devices is avoided, and that the various motor groups can be controlled individually by means of the secondary autotransformers pertaining to the same.

What I claim is:

In an electric train including a plurality of cars, the combination of at least one single-phase low-tension driving motor in each of said cars, said motors being grounded through the wheels of the cars, an autotransformer in each of said cars, ground connections between said auto-transformers and the wheels of the car for grounding said auto-transformers, said auto-transformers having pre-set secondary outlets connected to said motors respectively, a unipolar feeder extending along each of said cars and having terminals at the respective ends of the car for connection to the unipolar feeder of an adjacent car, connecting means connecting said unipolar feeder to the primary inlet of each said auto-transformer, a high-tension auto-transformer in one of said cars of the train, means connecting said last-mentioned auto-transformer to the wheels of the car carrying it to ground, said last-mentioned auto-transformer having an adjustable secondary outlet connected to the unipolar feeder of the car carrying it for feeding a controlled high tension current through said unipolar feeder to said first-mentioned auto-transformers in the individual cars of the train, and a current collector on one of said cars of the train, means connecting said current collector to the primary inlet of said last-mentioned high tension auto-transformer.

References Cited in the file of this patent

UNITED STATES PATENTS

| | | |
|---|---|---|
| 791,836 | Sundh et al. | June 6, 1905 |
| 870,147 | Wikander | Nov. 5, 1907 |
| 1,246,480 | Simmon et al. | Nov. 13, 1917 |
| 1,766,653 | Kubler | June 24, 1930 |
| 2,095,773 | Taliaferro | Oct. 12, 1937 |
| 2,400,971 | Barclay | May 28, 1946 |